Jan. 20, 1925.
C. W. MANN
TRANSMISSION BAND
Filed Feb. 2, 1923
1,523,551
2 Sheets-Sheet 1
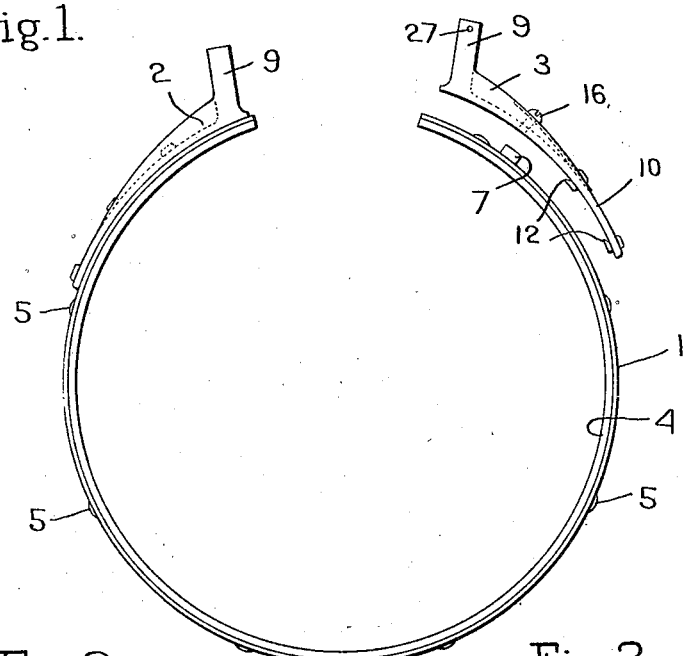
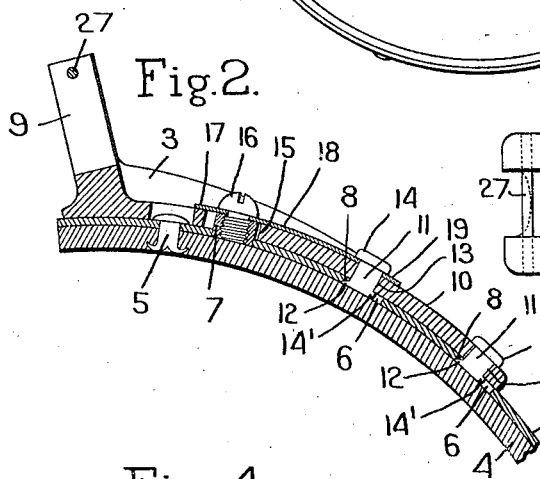
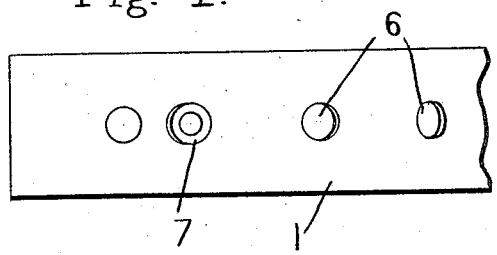
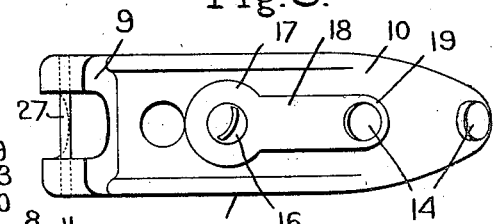
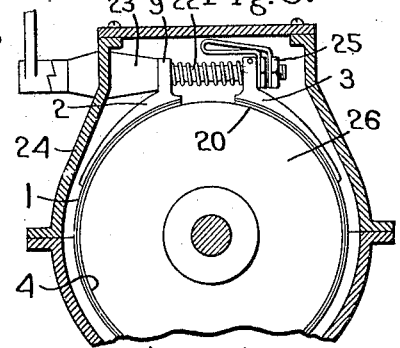
Inventor.
Charles W. Mann
by Heard Smith & Tennant.
Attys Jan. 20, 1925.  
C. W. MANN  
TRANSMISSION BAND  
Filed Feb. 2, 1923
1,523,551
2 Sheets-Sheet 2
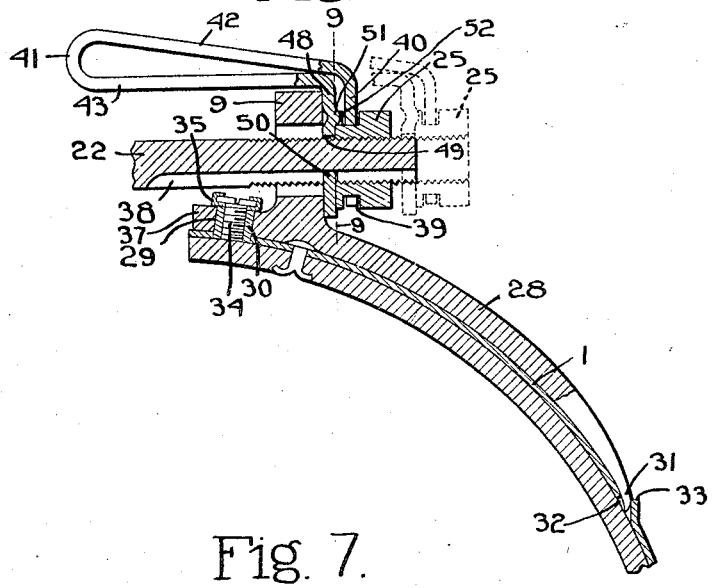
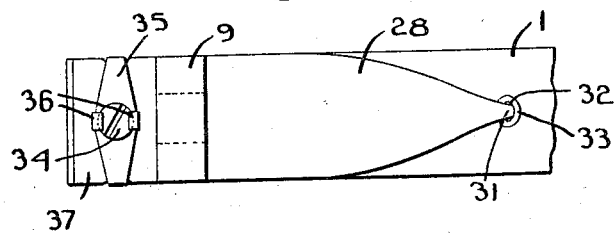
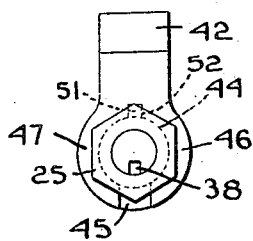
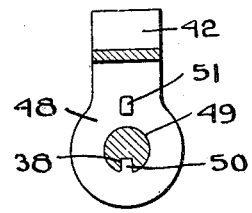
Inventor.  
Charles W. Mann  
by Heard Smith & Tennant  
Attys Patented Jan. 20, 1925.

1,523,551

UNITED STATES PATENT OFFICE.

CHARLES W. MANN, OF METHUEN, MASSACHUSETTS.

TRANSMISSION BAND.

Application filed February 2, 1923. Serial No. 616,594.

*To all whom it may concern:*

Be it known that I, CHARLES W. MANN, a citizen of the United States, and a resident of Methuen, county of Essex, State of Massachusetts, have invented an Improvement in Transmission Bands, of which the following description, in connection with the accompanying drawing, is a specification, like characters on the drawing representing like parts.

This invention relates to brake bands, or transmission bands, for use in a closely confined space such as those bands used in one well-known make of automobile having planetary transmission, and has particular reference to transmission bands of that type which are provided with a removable straining ear which can be removed to facilitate the insertion of the band into or its removal from such confined space.

The general object of the invention is to provide a transmission band of this type with novel means for securing the removable straining ear to the body of the band, such means being constructed to firmly and immovably secure the ear in place while permitting it to be readily detached.

Another object of the invention is to provide an improved transmission band of this type which is constructed so that when the band is contracted to apply braking pressure to a brake drum, such braking pressure will be evenly distributed throughout the length of the band.

Another object of the invention is to provide a combined handle and locking washer for holding the nut which bears against the movable ear in line with the threaded end of the band tightening rock shaft while being applied to the threaded end of the rock shaft, and for locking the nut in position when it is on the shaft.

The various features wherein the invention resides will be more fully hereinafter set forth and then pointed out in the appended claims.

The drawings illustrate in perspective and in detail a preferred form of construction adapted for use in a transmission band and embodying the broad principles of the invention.

In the drawings:

Fig. 1 is a side elevation of a transmission band with a removable straining ear showing the ear slightly removed from the band;

Fig. 2 is a sectional view showing the details of the ear mounted in the band;

Fig. 3 is a plan view of the removable ear;

Fig. 4 is a plan view of that portion of the band adapted to receive the ear;

Fig. 5 is a sectional view showing the transmission band in place;

Fig. 6 is a sectional view showing a modified form of the removable ear and the combined handle and locking means for the nut;

Fig. 7 is a plan view of the modified form of the ear shown in Fig. 6;

Fig. 8 is an end elevation of the nut and supporting member therefor;

Fig. 9 is a section on line 9—9, Fig. 6.

Only such parts of the device are illustrated as are necessary to show the manner of connecting the ear to the transmission band, it being understood that a band with a removable ear is not limited in its use to transmissions operating in a closely confined space, but may be used in any instance where it is desirable to have a transmission band separable from its associated straining ear.

The device illustrated is particularly adapted to be used in the transmission of a Ford car, and is so designed that the band, with the ear removed, may be inserted through the opening in the top of the transmission casing, and passed around the brake drum, and then the ear attached to the band, thus obtaining the insertion of a new band without necessitating the removal of the entire upper part of the transmission casing.

The transmission band comprises the usual resilient metal band, 1, having the lining, 4, that is secured thereto by rivets, 5, as usual, said band also having at its ends the two straining ears, 2 and 3.

The straining ear, 2, may be permanently secured to the metal band, 1, but the straining ear, 3, is removable therefrom and the present invention relates in part to the novel means of removably retaining it in place.

In the construction shown in Fig. 2 the band, 1, is provided with a plurality of apertures, 6, near one end, which are adapted to receive projections, 11, extending inwardly from the ear, 3, and said band is also provided with a boss, 7, which may be made integral therewith or welded thereto as desired and which is received in an opening, 15, formed in the ear, 3. The apertures, 6, are preferably undercut slightly, as shown at 8, and the projections, 11, fit the openings, 6, said projections having lips, 12, thereon to engage underneath the undercut portions of the metal band. The projections are preferably formed as lugs fitting tightly in openings, 13, in the curved portions of the ear, and extending through the ear both on the upper and the lower sides. The lugs are headed over on the upper side of the ear as at 14, and extend below the lower side of the ear, a distance equal to the width of the metal band. Thus the under portions of the lugs lie flat against and do not form humps in the asbestos lining of the band. The lugs are also headed over on the under side of the ear to hold them in place. The heading, however, is only done on the portion of the projection lying away from the end of the band, as at 14', the portion of the heading lying nearest the end of the band being tapered to form the lip. The ear has an aperture, 15, therein to receive the boss, 7, formed on the metal band.

Means are provided for firmly locking the removable straining ear, 3, to the band and in the present embodiment I employ a locking screw, 16, for this purpose which has screw-threaded engagement with the boss, 7, and is arranged to bear against the outer face of the removable ear. If the head of the screw is smaller than the aperture, 15, which receives the boss, 7, then I will preferably employ a washer or its equivalent, 17, beneath the head of the screw and which is of sufficient size to bear against the ear. The boss and projections, 11, serve to hold the ear in place on the band and the locking screw locks the ear firmly in place.

The invention also comprehends anchoring means for securing the locking screw to the ear so as to obviate any possibility that said screw will become lost, and in the construction illustrated in Figs. 2 and 3 such anchoring device is a strip of metal, 18, fastened at one end, 19, under the head of one or more of the lugs, and formed integral with the washer, 17. The locking device, including both the metal strip and the washer, has three distinct functions. First, it holds the screw from falling away from the ear when the screw is loosened and removed from the boss. Second, by frictionally engaging both the top of the boss and the top of the ear it prevents any relative movement between the boss and the ear, thereby preventing any play between the band and the ear, and third, it retains the ear in position on the band with the lips on the projections on the ear always engaging under the undercut portions of the band, thus preventing the ear from falling away from the band.

When the ear is to be placed on the band it is held in the position shown in Fig. 1. The ear is then put on the band with the boss on the band projecting through the opening in the ear and the lugs on the ear projecting in through the unthreaded openings on the band. The ear is then pushed toward the adjacent end of the band whereby the lips on the lugs engage the undercut portions of the openings on the band. When the ear and band are in this position the screw is directly over the opening in the boss and by screwing the screw down tightly against the ear, or anchoring device, the ear is held fast on the band, the lugs and boss preventing any slippage toward the end of the band, and any lateral movement, and the anchoring device preventing slipping away from the end of the band whereby the ear might become loosened and leave the band.

When it is desired to remove the ear the screw is simply backed out of the threaded boss and, by means of a blow, the ear backed away from the end of the band until the lips on the lugs are free from the undercut portions of the band. The ear is then free to be removed.

Another feature of the invention relates to a novel construction by which when the transmission band is contracted to apply braking pressure to the brake drum such pressure will be distributed evenly throughout the length of the brake lining thus obviating undue wear at the end, 20.

The straining ears, 2 and 3, of the transmission bands are provided with the upstanding portions, 9, each being slotted to receive the rock shaft, 22, to which the brake pedal is secured and with respect to the brake band. The upstanding portion, 9, of the ear, 2, rests against a fixed abutment, 23, in the housing or casing, 24, while the upstanding portion, 9, of the ear, 3, is engaged by a nut, 25, screwed onto the rock shaft, 22. With this construction the tightening of the transmission band to apply a braking pressure on the drums, 26, is accomplished by movement of the end of the band to which the ear, 3, is attached and with the construction formerly used the contracting of the brake band results in a tendency for a greater pressure to be applied at the end, 20, of the brake lining with the result that it frequently happens that this end of the brake lining will wear out before the other part of the lining has worn much if any.

To overcome this I have provided means whereby when the brake band is contracted the ear, 3, is prevented from being crowded downwardly toward the brake band but is on the contrary moved in a direction parallel to the rock shaft, 22. One way of accomplishing this is to provide the upstanding portion, 9, of the ear, 3, with an aperture through which the rock shaft, 22, extends rather than with an open slot as usual. Such aperture can conveniently be made by inserting a pin, 27, transversely across the two arms of the upstanding portion, 9, above the shaft, 22, and with this construction when the brake band is tightened the engagement of the pin, 27, with the rock shaft, 22, will cause the ear to be moved in a direction parallel to the rock shaft thus distributing the friction pressure evenly through the length of the brake lining, 4, and preventing the ear, 3, from being forced downwardly in a radial direction as well as laterally so as to apply a greater pressure to the end, 20, of the brake lining.

In the modified construction shown in Fig. 6 the removable ear, 28, is provided with an aperture, 29, to receive the boss, 30, on the band, 1, as in the modification shown in Fig. 2, but in this instance the projection on the ear is formed at the end thereof and is constituted by the inturned pointed end, 31, the band having the aperture, 32, to receive the projection. The edge, 33, of the aperture, 32, is struck up to overlie the pointed end, 31, of the ear, to assist in holding the ear on the band. The boss may be made integral with the band or fixed thereto by any of the known methods of joining metals, as by welding. The means for firmly locking the removable straining ear to the bar in the modified construction is a locking screw, 34, with a flat head, the screw being anchored to the straining ear by means of a strip of metal, 35, extending transversely of the ear and having bent portions, 36, which are turned up over the flat head of the screw to prevent the screw from having movement independently of the ear other than rotary movement. The ends of the metal strip are fastened to the sides of the straining ear in any manner desired.

In the modification shown in Fig. 6 the locking screw, 34, is located on the opposite side of the upstanding portion, 9, from that shown in Fig. 2, and for this purpose the ear, 28, is provided with an extension, 37, in which the aperture, 29, is formed. The upstanding portion is solid across the top instead of having the two projecting arms and pin, 27, which are used in the modification shown in Fig. 2. The upstanding portion has the usual opening to permit the end of the band tightening rock shaft, 22, to pass therethrough and to extend to such a distance beyond the upstanding portion that the nut, 25, may be placed thereon for engagement with the upstanding portion. The threaded end of the rock shaft has a groove, 38, cut longitudinally along the shaft for purposes to be hereinafter described.

In order to facilitate applying the nut, 25, to the threaded end of the rock shaft and to obviate any danger that the operator may drop the nut into the gear casing, 24, I have provided a nut supporting member for supporting and holding the nut while being applied to the rock shaft. The nut, 25, has a groove, 39, around its periphery to co-operate with a supporting member, 40, by which the nut is held. The supporting member is formed in one end of a section of strap metal which is bent back on itself at 41 to form a handle portion having sections, 42 and 43, which are preferably formed to extend substantially horizontally and parallel to the rock shaft, 22. The end, 40, of the section, 42, has an aperture, 44, therethrough and a portion of the wall of the aperture is cut out, as at 45, to form arms, 46 and 47, which compose a yoke operating in the groove of the nut to permit free turning movement of the nut and by means of which the nut may be held in line with the threaded end of the rock shaft.

The end portion, 48, of the section, 43, has an aperture, 49, therethrough forming an apertured locking washer movable longitudinally along the threaded end of the rock shaft and lying intermediate of the nut, 25, and the upstanding portion, 9. A tongue, 50, extends from the wall of the aperture for projection into and co-operating with the groove, 38, in the threaded end of the rock shaft to prevent rotation of the locking washer.

The nut and washer have relatively yielding interlocking portions acting to lock the nut in position. A convenient way to form the interlocking portions is to form a projection, 51, on the locking washer for engagement with a notch, 52, on that face of the nut which bears against the locking washer.

When the ear shown in Fig. 6 is being put on the brake band the pointed end, 32, of the ear is set in the aperture, 28, of the brake band with the extreme end under the turned up edge, 30, of the aperture. Then the ear is dropped into place with the aperture, 33, fitting over the boss, 34, formed on the band and the locking screw, 35, is screwed down to hold firmly the ear on the band. The threaded end of the rock shaft is then put through the upstanding portion of the ear and the nut, 25, held in the combined handle and locking washer, is brought into the postion shown in dotted lines in Fig. 6 with the locking washer on the end of the rock shaft and the tongue, 50, projecting into the groove, 38. By means of a wrench or other tool the nut is screwed on the end of the rock shaft. The locking washer is prevented from rotating by means of the tongue, 50, engaging with the sides of the groove, 38, and at every complete turn of the nut the interlocking parts of the nut and washer come into locking position so that when the nut is set to the desired position the tool may be removed and the nut left in the desired position with the assurance that it will not become inadvertently loosened and unscrewed from the shaft.

It will thus be seen that by a relatively simple and easily formed contrivance I have made a combined handle and locking washer with which the nut which goes on the threaded end of the band tightening rock shaft may easily be held in position while being applied to the rock shaft, and will be locked in any position to which it is set when on the rock shaft.

Although a particular and preferred form of the invention has been described, modification may be made, and the invention is to be construed as broadly as the limitations in the claims, taken in conjunction with the prior art, may allow.

Having thus described the invention, what is claimed as new, and desired to be secured by Letters Patent, is:

1. In a brake band of the type comprising a resilient metal band having a straining ear at each end, the combination with a band having an aperture and a boss at one end, of a straining ear provided with a projection to enter said aperture and with an aperture to receive said boss, a locking screw having screw-threaded engagement with the boss and operating to removably retain the boss in the aperture of the ear, and means for securing the screw to the ear while permitting it to be screwed into or unscrewed from the boss.

2. In a brake band of the type comprising a resilient metal band having a straining ear at each end, the combination with said band having an aperture and a boss at one end, of a straining ear provided with a projection to enter said aperture, and with an aperture to receive said boss, a locking screw having screw-threaded engagement with the boss, said locking screw operating to retain the boss in the aperture of the ear, and an anchoring device to anchor the screw to the ear.

3. A brake band for a planetary transmission comprising a resilient metal band having a threaded and an unthreaded opening therein near one end, a removable straining ear having a projection thereon placed for registry with the unthreaded opening on the band, and an opening for registry with the threaded opening in the band, an anchoring device secured to the ear, and a locking screw carried by the anchoring device, adapted to project through the opening in the ear and have screw threaded engagement with the threaded opening in the metal band.

4. A brake band for a planetary transmission comprising a resilient metal band having near one end a threaded boss and an opening, a removable straining ear having a projection thereon placed for registry with the opening on the band, and an opening for registry with the boss, an anchoring device secured to the ear, a locking screw carried by the anchoring device, and adapted to have its head exert force against the ear and its shank project through the opening in the ear and screw into the threaded boss to retain the ear on the band.

5. The combination of a brake band of the type comprising a resilient metal band having at each end a straining ear provided with an upstanding portion, a hollow fixed abutment against which one ear engages, a band tightening rock shaft passing through the fixed abutment and through both ears, and threaded on the end opposite the abutment, a nut on the threaded end of the rock shaft to bear against the other ear, a nut supporting member in which the nut is mounted for free turning movement in either direction and by which the nut may be held while being applied to the threaded end of the rock shaft.

6. The combination of a brake band of the type comprising a resilient metal band having at each end a straining ear provided with an upstanding portion, a hollow fixed abutment against which one ear engages, a band tightening rock shaft passing through the fixed abutment and through both ears and threaded on the end opposite to the abutment, a nut on the threaded end of the rock shaft to bear against the other ear and having a groove around its periphery, a handle for holding the nut while being applied to the threaded end of the rock shaft, said handle having a yoke portion operating in the groove of the nut to permit free turning movement of the nut.

7. The combination of a brake band of the type comprising a resilient metal band having at each end a straining ear provided with an upstanding portion, a hollow fixed abutment against which one ear engages, a band tightening rock shaft passing through the fixed abutment and through both ears, and threaded on the end opposite to the abutment, a nut on the threaded end of the rock shaft to bear against the other ear, and having a groove around its periphery, a handle having a portion extending parallel to the rock shaft and a short apertured portion extending transversely of the rock shaft with the aperture of which the groove in the nut co-operates, to removably retain the nut in the aperture, the wall of the aperture being split to permit the insertion of the nut in the aperture.

8. The combination of a brake band of the type comprising a resilient metal band having at each end a straining ear provided with an upstanding portion, a hollow fixed abutment against which one ear engages, a band tightening rock shaft passing through the fixed abutment and through both ears, threaded on the end opposite the abutment, and having a longitudinal groove along said threaded end, a nut on the threaded end of the rock shaft to bear against the other ear, with a notch on the face of the nut bearing against the ear, a section of strap metal bent back on itself to form a handle portion extending parallel to the rock shaft, the ends being bent to form two short apertured portions extending transversely of the rock shaft, one end having its aperture co-operating with the groove in the nut, to movably retain the nut in the aperture, and having the side of the aperture split to permit insertion of the nut in the aperture, and the other end forming an apertured lock washer movable longitudinally along the shaft, and located intermediate of the nut and ear, with a projection for engagement with the notch on the nut, acting to lock the nut in position, and a tongue projecting from the side of the aperture and co-operating with the groove of the shaft for preventing revolution of the washer with the nut.

In testimony whereof, I have signed my name to this specification.

CHARLES W. MANN.